June 18, 1946.    P. CHAPMAN    2,402,125

BRIDGE CONSTRUCTION

Filed April 6, 1942

Paul Chapman

INVENTOR

Patented June 18, 1946

2,402,125

UNITED STATES PATENT OFFICE 2,402,125

BRIDGE CONSTRUCTION

Paul Chapman, New York, N. Y.

Application April 6, 1942, Serial No. 437,758

7 Claims. (Cl. 14—20)

My invention provides means whereby in suspension bridges with flexible supporting cables, shallow stiffening girders may be rendered so rigid that wind and concentrated live loads produce such small flexures that undulation and bouncing of the bridge are eliminated. Shallow girders are preferable to deep trusses, because of economy and graceful appearance and because they do not obstruct views from the roadway. In customary roadway and girder construction, wind blowing horizontally in certain directions, produces serious vertical loadings on the bridge, as hereinafter described, so my invention embraces an improvement in roadway construction which in combination with the other improvements make the bridge safe and economical. The other improvements comprise diagonal suspenders under initial tension between girders and supporting cables, to form triangulated trusses for main and anchorage spans with the anchorage trusses fixed to the anchorages, and elastic ties connected at ends to main and anchorage span girders to transfer horizontal wind loads and partially fix the trusses at towers for wind and live loadings. Since girders and ties form a continuous line between anchorages, thermal length change therein induces a horizontal force throughout to cancel that change. Ties are made long enough to avoid excessive stresses due to thermal length change of girder portions in this line. The invention embraces an adaption wherein girders are are made continuous at towers with elastic ties omitted, and which is advantageous where thermal change is small. Aforementioned diagonal suspenders are given enough initial tension to counteract compression therein from live and wind loadings and temperature change, balanced loads in opposing suspenders avoids cable band slippage, and cables carry dead load with no bending stresses in stiffening girders. In customary shallow girder suspension bridge construction, resistance to unsymmetrical loadings arises from changed contour of cables, whereas in my invention, cables girders and diagonal suspenders form top-chords, bottom-chords and web-members of trusses which resist similar loadings with relatively small change in cable contour.

In the drawing, Fig. 1 is an elevational view of the bridge, Fig. 2 is a plan view with a part of the lateral bracing between cables shown by dotted lines, Fig. 3 is a cross-sectional view near midspan, Fig. 4 is a cross-sectional view of the roadway parallel to assumed diagonal wind as shown by arrow of Fig. 2, Figs. 5, 6 are elevational and plan views showing a cable band jointly connecting diagonal and vertical suspenders and lateral cable bracing to a cable, Fig. 7 is an elevational view of a connection of diagonal suspenders to cable showing a method of preventing slipping of the cable band, Fig. 8 is an elevational view of a connection of diagonal suspenders to cable which transfers reactions normal to cable, Fig. 9 is an elevational view of a connection of diagonal suspenders to girder, Fig. 10 is an elevational view of a balanced connection of diagonal suspenders to girder, Fig. 11 is an elevational view of the connection of diagonal suspenders jointly to anchorage and mainspan girders, Fig. 12 is an elevational view of a connection of diagonal suspenders to girder where continuous past tower, Fig. 13 is an elevational view of of a conjunction of both diagonal suspenders to anchorage girder at tower, Fig. 14 is an elevational view of a connection of both diagonal suspenders to tower at girder level, Fig. 15 is an elevational view of adjustable connection of elastic tie to girder, and Fig. 16 is a sectional view of intermediate connection of elastic tie to girder, which permits relative longitudinal movement.

The various formulas and force analyses are in accordance with applicant's theories, are correct according to his best knowledge and are inserted to explain his conception of the theoretical functioning of the various structural features of the invention.

As shown in Figs. 1, 2, flexible cables 3 extend between anchorages 1 and over towers 2, and support entire dead load at normal temperature through vertical suspenders 4 and diagonal suspenders 6a, 6b, 6c, 6d, 6e, 6f, 6g connected to stiffening girders 5, 5a. With diagonal suspenders elastic ties 7 and vent gratings 8a, 8b, omitted, the bridge would be of customary type, so my invention embraces their addition as herein described, to render the bridge stronger more rigid and prevent bouncing and twisting in the wind. In customary construction, floor-beam 9 in Fig. 3 would have a solid web, but the articulated web shown is more desirable. Solid webs are also customary in shallow stiffening girders, but in Figs. 9 to 15 articulated webs are also shown as more desirable. Fig. 12 shows an adaption wherein the stiffening girder is made continuous across tower with elastic tie 7 omitted, the girder being supported at tower by a moment transferring expansion joint. This adaption is useful in locations of small temperature change, for bridges with little roadway grade (since horizontal length of girder is increased, approximately twice increase by temperature rise of mainspan cable dip, times mainspan roadway rise divided by half mainspan), or where girder length change is otherwise provided. Thermal unit stress in ties 7 varies with elastic modulus and thermal expansion, so wire rope having half the elastic modulus of solid steel and Invar steel having no thermal expansion, are useful therefor. Where wire rope is used, ties are given initial tension to compensate for possible compression therein. In Figs. 15, 16, ties 7 are shown of rigid construction, and brackets 5e on girder 5a allow relative longitudinal movement only, between tie and girder, and are suitably spaced to prevent buckling of tie 7.

In customary construction, total longitudinal wind pressure on mainspan roadway construction is transferred to cables by midspan cable-girder ties. One-half this pressure or horizontal load is transferred by increased cable tension to windward anchorage (assumed right anchorage by Fig. 1), and the other half to lee anchorage by decreased tension in left half of cable. The mainspan roadway moves leeward the horizontal stretch of windward half of cable or horizontal recoil of lee half. No transverse bending results at midspan, but at windward quarter-point an upward moment and at lee quarter-point a downward moment, each equals one-half horizontal mainspan load times one-quarter mainspan cable dip. At midpoint of windward and lee anchorage spans, upward and downward moments respectively, each equal one-half horizontal mainspan load (less tower effect) times cable dip. Anchorage girders windward half of mainspan girder and lee half, each act as simple beams in resisting foregoing moments and, being shallow, have little effect thereon.

In bridges with slight roadway grade, the foregoing moments are resisted by stiffening girder and change of cable contour. Upward flexures of windward half and downward flexures of lee half, each equal their foregoing moments (reduced for girder resistance to flexure) divided by horizontal force in cable. These flexures locate the static cable contour. Downward flexures of lee half exceed upward flexures of windward half, causing a net lowering of the bridge and a net downward propelling force exerted until the static cable contour is passed and the cable recoil contour is reached. Distance between static and recoil contour, is fixed by the momentum of bridge mass in passing static contour (due to rapidity of wind application). At recoil contour, more than half mainspan longitudinal wind load is carried windward by increased cable tension, and less than half carried leeward by decreased cable tension, so that from recoil contour back past static contour, net increased cable tension (plus girder recoil) moves the mainspan upward. If bridge characteristics are such that recoil just returns it to normal position (assuming the wind suddenly applied), each repetition of foregoing actions produces like upward and downward movements under constant wind. If characteristics are such that recoil does not return the bridge to normal position, the bridge under constant wind will finally come to rest at static contour. If characteristics are such that recoil returns the bridge past normal position, the bridge may fail, because momentum is added to consecutive downward and upward movements. Energy, represented in recoil or momentum, is imparted to the bridge by net longitudinal movement under wind pressure, and the bridge may fail unless this energy is dissipated by fanning action resulting from upward and downward roadway movements described. My invention of elastic ties 7, Figs. 1, 2, 15, 16, connects the mainspan to both anchorages 1 through girders 5a, thus reducing mainspan movement and resultant flexures. My invention of diagonal suspenders 6a, 6b, 6c, 6d, 6e, 6f, 6g, Fig. 1, being under initial tension, acting with cables 3 and girders 5, 5a forms trusses which resist with small flexures, that portion of mainspan longitudinal wind load not carried by elastic ties 7. My invention of center and side roadway vents 8a, 8b, Figs. 2, 3 is of little use in bridges with slight roadway grade. In the foregoing analysis, maximum flexures of both halves have been considered as simultaneous, however since lee flexures exceed windward, certain conditions may cause them to lag behind, thus causing complex flexure conditions difficult to analyze.

In bridges with considerable roadway grade as shown in Fig. 1, longitudinal wind causes an upward loading on lee half arising from exposure of bottom of the roadway construction, and a downward loading on windward half arising from exposure of roadway top. These loadings vary with roadway grade and are somewhat greater on lee half, however quarter-point moments therefrom each equal roughly, mainspan upward or downward load times one-sixteenth mainspan. These moments oppose moments from direct longitudinal wind heretofore described, and usually exceed them, so that upward flexure occurs in lee half mainspan and downward in windward half. (With mainspan longitudinal wind load about twice total vertical wind loadings thereon, and cable dip one-eighth span, moment from vertical loadings equals that from longitudinal.) Under this condition, a net raising of the mainspan occurs with a retarding force arising therefrom. Static cable contour is fixed by net bending moment (less girder effect) divided by horizontal force in cable. Momentum forces the construction beyond to recoil cable contour; during recoil there is a net drop of mainspan with a consequent propelling force. Energy, of recoil or momentum, is imparted by the wind from upward movement of windward and downward movement of lee half of bridge, and from longitudinal recoil movement of mainspan which moves leeward slightly with upward movement of windward half; and energy is dissipated by vertical recoil movement and foregoing longitudinal movement. Whether the bridge will assume static contour, flex in cycles, or be crippled, under constant wind, depends on characteristics which determine if energy imparted is less, equal, or greater, than that dissipated. The ideal condition for resistance to longitudinal wind occurs where the foregoing two moments cancel each other and no flexures result therefrom. With smooth unobstructed roadway top and bottom, total vertical pressure is about twice that of the projected wind exposure, the ratio being twice sine of grade divided by (1 plus sine squared); however, with solid web floorbeams and girders, the ratio is increased about thirteen fold for a one-degree grade and five one-half for a three degree grade. Central and side roadway gratings 8a, 8b reduce air-pocket effect of girders and floorbeams thus greatly reducing foregoing ratios, and in some cases being sufficient to render the bridge satisfactory. In bridges with wide steep roadways, diagonal suspenders, and elastic ties, also may be required.

Under direct lateral wind, the roadway is forced leeward inclining suspenders, thereby transferring pressures to and deflecting the cables laterally. The transfers vary from zero near towers to maximum near midspan because of suspender lengths. In Fig. 3 suspenders 4 are shown with component parts parallel; however, bridges have been built with axes of suspender parts intersecting below cable center, so that near midspan lateral pressures are transferred from roadway to cables with little suspender inclination. In Fig. 1, lateral wind is applied above tower reaction points, for that portion carried by the roadway construction acting as a beam with girders 5 flanges thereof, so that twisting or torque occurs. In customary bridges with non-torque-resisting roadways and suspenders as shown in Fig. 3, each panel contributes algebraically, torque equalling, panel wind times distance above tower reaction level, minus wind transferred to cables times distance of suspender connection above same level. Panel torque causes an upward load on windward girder or downward load on lee girder equal to torque divided by roadway width; in the foregoing calculations, negative results are obtained near midspan, indicating downward loads on windward and upward loads on lee girder thereat. Little torque occurs in anchorage spans, and since vertical loadings from mainspan torque are both upward and downward on each girder 5, only slight decrease or increase of horizontal tension in windward or lee cables 3 results. Tentative flexures are obtained by dividing simple beam moments of vertical wind loads on mainspan by horizontal cable tension combined with girder stresses from roadway beam action before noted. These flexures by tilting roadway, cause additional vertical wind loadings and flexures upward near quarter points and downward near midspan, for both girders 5. The combination of foregoing flexures approximately locates static cable contours. Static cable contours usually indicate a small net raising of the mainspan, so a retarding force results as wind forces the mainspan from normal past static and to recoil contours, and a propelling force on recoil therefrom to counter-recoil contours. With bridge characteristics such that average of counter-recoil contour of windward and lee cables is equivalent to normal contour, bridge movements will continue under constant wind; if that average lies between normal and static contours, the bridge will finally rest at the static contour; if that average lies beyond normal contour, flexures may continually increase from momentum until failure results. Energy of recoil or momentum, is transferred to the bridge by windward movement under wind pressure and by vertical movements under vertical wind pressure; and dissipated by recoil under wind pressure and also fanning action of roadway vertical movements. Center and side roadway vents reduce vertical wind pressures, but also fanning effectiveness. Elastic ties 7 reduce heretofore described wind torque an amount equalling difference of stress in windward and lee ties times roadway width times sine of roadway grade at towers; they also reduce lateral bending moment on roadway that difference times roadway width times cosine of grade. Diagonal suspenders 6a to 6g by producing truss action between cable and girder, minimize flexures near quarter points.

Diagonal wind, as shown by arrow W in Fig. 2, is equivalent to a combination of longitudinal and lateral wind, with the invention in whole or in part adaptable for resistance thereto. In Fig. 4, roadway 8 slopes leeward because of roadway grade and diagonal wind flexures, with lee and windward girders at static contour positions. Dotted line 8t indicates roadway recoil and line 8u counter-recoil positions. When counter-recoil position under constant wind approximates normal position, constant vertical movements recur.

Under either lateral or diagonal wind, windward girder 5 serving as the compression chord of the roadway lateral bracing system, may be in compression from tower to midspan. To function as a stiffening girder, girder 5 must not have appreciable flexure as a compression member, a condition existing when compression length divided by radius of gyration is less than three times square root of elastic modulus divided by unit stress. Elastic ties 7 of my invention serve to reduce compression length as hereinbefore described, and diagonal suspenders reduce unsupported length of member 5.

In customary construction, unsymmetrical or concentrated live loadings cause sharp changes in cable contour with resultant severe girder stresses; thus, with live load on right half of mainspan, one-quarter of that load is transferred at midspan toward left tower, by cable flexure and girder shear. Elastic ties 7 serve to reduce this load transfer an amount equalling the difference of stress in right and left ties 7 times tower height above roadway divided by half mainspan. Diagonal suspenders 6a to 6g greatly reduce cable contour change at midspan, and since suspenders 6g are short and carry appreciable loads, they may be made of rigid construction to avoid initial tensile stresses therein.

In Fig. 1, assuming diagonals 6e, 6g extended to meet counterparts of right halfspan and cable 3 straight between connections with diagonal suspenders, girder 5, cable 3, diagonals 6b, 6c, 6f, 6g form a simple truss between towers capable of resisting non-uniform loadings independent of cable deformations; similarly cable 3 girder 5 diagonals 6a, 6d, 6e form another simple truss; and girder 5 cable 3 diagonals 6a to 6g form a doubly triangulated truss. For the anchorage spans, cable 3, girders 5a and diagonals likewise form trusses. Bottom chords 5a of anchorage span trusses, are attached to anchorages 1 by anchors 5b, thus with cables 3 fixing the trusses thereat and adding rigidity to the bridge. In Fig. 9, diagonal suspenders are shown with axes intersecting near girder axis, to avoid eccentric loading therefrom. In Fig. 7, cable strands 3c are shown stopping at cable band 3b which serves to connect suspender 4 and diagonals 6b, 6c to cable 3. In Fig. 8, diagonals 6b, 6c are connected to cable band 3f by pin-connected swivel link 3g which balances stresses in diagonals to transfer stresses normal to cable. This adaption reduces temperature stresses in mainspan diagonal 6b. In Fig. 10, diagonals 6a, 6d are connected to girder 5 by pin-connected swivel link 5g which balances stresses in diagonals, thus transferring vertical stresses to girder and serving to reduce temperature stresses in mainspan diagonal 6a. In Figs. 5, 6, cable struts 3d and laterals 3e form a lateral cable bracing system capable of transmitting stresses to towers independently of cables. In Fig. 15, threaded end 7a of tie 7, has two threaded nuts screwed against ends of loose nut 5i fixed to girder 5a, to provide adjustment or initial tension in tie 7. Ties 7 resist longitudinal rotation (clockwise or anti-clockwise movement in the longitudinal plane) by their induced stress times their distance below tower tops. As shown in Fig. 1 and hereinbefore described, cables girders and diagonal suspenders form independent trusses for main and anchorage spans, with no connections to each other at towers, other than elastic ties; however, adaptions are shown in Figs. 11, 13, 14, whereby some continuity is obtained by jointly connecting diagonals 6b of main and anchorage spans, to both main and anchorage span girders, anchorage span girder, or tower. In Fig. 11, pin-connected arms 5c, 5d extend diagonally downward from girders 5, 5a respectively, and are jointly connected at their junction to main and anchorage span diagonals 6b. Temperature rise tends to slacken off both diagonals 6b, and to decrease gap between girders thus lowering junction of arms 5c, 5d with diagonals 6, and compensating for said slackening off of diagonals 6. Reverse action occurs for a fall in temperature. In some types of bridges, this adaption may furnish required continuity at towers. In Fig. 13, main and anchorage span diagonals 6b are jointly connected to anchorage girder 5a through a swivel link 5h. Greater stresses occur in main than anchorage span diagonals 6b, so swivel link 5h is inclined to balance initial tensions therein. In Fig. 14, diagonals 6b are jointly connected to pin 2c on tower 2, by swivel link 2b which is inclined to balance unequal initial tensions in main and anchorage span diagonals 6b. In adaptions of Fig. 11, 13, 14, a restraint against longitudinal rotation at towers equals induced horizontal stress in diagonals 6b times distance between their junction and tower top. In Figs. 11, 13, 14, girders 5, 5a are shown disconnected, and supported by shear-transmitting expansion joints, however, my invention is intended for use in types of bridges wherein main and anchorage span girders are connected together or to towers by moment-transferring expansion joints. In the adaption of Fig. 12, wherein girder 5 is continuous between anchorages, the structure is a suspension bridge for dead load and a combination suspension-cantilever type for wind and live loads, which in certain climates may require girder 5 to be Invar or high-strength steel because of temperature stresses.

In shallow girder suspension bridge construction, under temperature change, flexure at any point is approximately, dead load moment divided by horizontal cable tension, less normal cable dip. With my invention, these flexures are reduced by relative rigidity of cable girder and diagonals acting as a truss. Movement of tower top toward midspan equalling that toward anchorage; tower length-change times distance of tower top above cable anchorage divided by anchorage span, equals half mainspan cable length-change times mainspan divided by mainspan cable length, minus anchorage-span cable-length change times anchorage span divided by anchorage-span cable length. Cable length-change is change from temperature less elastic change arising from flexures. From the two foregoing equations, horizontal cable tension and required initial tension for diagonals is determined.

In the foregoing description, my invention has been described as applied to customary bridges, however, it is intended for use in conjunction with other improvements. Thus, it may be used in bridges having cable-sway-bracing systems or torque-resisting-roadway systems which reduce twisting under certain wind and live loadings, or in bridges wherein stiffening girders are under initial tension to avoid buckling tendency under wind or to assist cables in carrying loadings. The invention may also be used in single or multiple span bridges.

I claim:

1. In bridges having flexible supporting cables extending between anchorages and over towers and with stiffening girders supported therefrom, means to prevent bouncing and excessive flexures from wind and unsymmetrical loadings, comprising the combination of: diagonal suspenders supporting dead load extending between said girders and said cables, and forming triangular outlines in combination with said girders and cables, and vertical suspenders at intervals extending between said girders and said cables and also supporting dead loads; and elastic ties extending along said girders past expansion joints in said girders at towers and fixed at each end to said girders, anchors fixing said girders longitudinally to said anchorages, said ties and anchors in conjunction with said cables and girders partially fixing said bridge against longitudinal rotation at said towers and achorages; all substantially as described.

2. In a bridge having flexible supporting cables extending between anchorages and over towers, with stiffening girders supported therefrom, means to prevent bouncing and excessive flexures from wind and unsymmetrical loadings, comprising: vertical and diagonal suspenders carrying dead loads and extending between said cables and girders; elastic ties each having one end attached to an anchorage stiffening girder and its other end attached to a main span stiffening girder and extending past an expansion joint between said girders at a respective said tower; said ties acting in conjunction with said cables tending to restrain the bridge against longitudinal rotation at the towers, thereby reducing flexures, substantially as described.

3. In a bridge having flexible supporting cables extending between anchorages and over towers, with stiffening girders suspended therefrom by vertical and diagonal suspenders, means to reduce flexures by partially fixing the bridge against longitudinal rotation at the towers, comprising: an expansion gap between ends of said girders at said towers; pins in said ends; and rigid arms connected to said girders by said pins and extending diagonally downward to conjunction; diagonal suspenders of main and anchorage spans meeting at said conjunction; pins connecting said rigid arms and said diagonal suspenders together, and moving vertically with change of expansion gap and with said vertical movement compensating for length change of said diagonal suspenders due to horizontal movement; and said diagonal suspenders thus maintained under initial tension from dead load, partially restraining the bridge from longitudinal rotation at the towers, substantially as described.

4. In a bridge having flexible supporting cables extending between anchorages and over towers, with stiffening girders suspended therefrom by vertical and diagonal suspenders, means to reduce flexures by partially fixing the bridge against longitudinal rotation at the towers, comprising: expansion gaps between ends of said girders at towers; diagonal suspenders of main and anchorage spans under suitable initial tension and conjoining at said gap; swivel links with a pin at each end connecting each anchorage span girder to each conjunction of said diagonal suspenders; said swivel links maintaining and balancing tension in said diagonal suspenders; and said tension in said diagonal suspenders thus partially restraining the bridge against longitudinal rotation at the towers, substantially as described.

5. In a bridge having flexible supporting cables extending between anchorages and over towers, with stiffening girders suspended therefrom by vertical and diagonal suspenders, means to reduce flexures by partially fixing the bridge against longitudinal rotation at the towers, comprising: expansion gaps between said girders at each tower; diagonal suspenders from anchorage and main spans under suitable initial tension and conjoining at each said gap; swivel links each with a pin at one end connected to a said tower and a pin at other end connecting said diagonal suspenders together; said other end being free to maintain and balance tension in said diagonal suspenders, thus partially restraining the bridge against longitudinal rotation at the towers, substantially as described.

6. In a bridge having flexible supporting cables extending between anchorages and over towers, with girders suspended therefrom by vertical and diagonal suspenders: cable bands each connecting two diagonal and a vertical suspender to a said cable; swivel links with a pin at each end and each connecting the conjunction of two diagonal suspenders to a said cable band, and transferring thereto only tension nearly normal to said cables to prevent slippage of said bands along said cables, substantially as described.

7. In a bridge having flexible supporting cables extending between anchorages and over towers, with girders suspended therefrom by vertical and diagonal suspenders: swivel links each having a pin in each end, one of said pins connecting two opposing said diagonal suspenders to a said swivel link and other said pin connecting a said swivel link to a said girder, said swivel link serving to balance tensions in said opposing diagonal suspenders, substantially as described.

PAUL CHAPMAN.